US009598182B2

(12) United States Patent
Bradlow et al.

(10) Patent No.: US 9,598,182 B2
(45) Date of Patent: Mar. 21, 2017

(54) EXTERNAL MICROPHONE FOR AN UNMANNED AERIAL VEHICLE

(71) Applicant: Lily Robotics, Inc., San Francisco, CA (US)

(72) Inventors: Henry W. Bradlow, Berkeley, CA (US); Antoine Balaresque, Berkeley, CA (US)

(73) Assignee: Lily Robotics, Inc., San Francisco, CA (US)

( * ) Notice: Subject to any disclaimer, the term of this patent is extended or adjusted under 35 U.S.C. 154(b) by 0 days.

(21) Appl. No.: 15/094,796

(22) Filed: Apr. 8, 2016

(65) Prior Publication Data

US 2016/0332747 A1 Nov. 17, 2016

Related U.S. Application Data

(63) Continuation-in-part of application No. 14/875,268, filed on Oct. 5, 2015.

(Continued)

(51) Int. Cl.

*B64D 47/08* (2006.01)
*G10L 21/0208* (2013.01)

(Continued)

(52) U.S. Cl.

CPC ............ *B64D 47/08* (2013.01); *B64C 39/024* (2013.01); *G05D 1/0022* (2013.01); *G10L 15/22* (2013.01);

(Continued)

(58) Field of Classification Search

CPC ..... B64D 47/08; G10L 21/0208; G01L 15/22; H04R 1/08

See application file for complete search history.

(56) References Cited

U.S. PATENT DOCUMENTS 5,479,351 A * 12/1995 Woo .................. G11B 27/3036 348/515
7,817,905 B2 * 10/2010 Shellshear ............ G11B 27/10 386/224

(Continued)

FOREIGN PATENT DOCUMENTS

RU 2370829 C2 10/2009
RU 116628 U1 5/2012

OTHER PUBLICATIONS

U.S. Appl. No. 14/875,268 by Bradlow, H.W., filed Oct. 5, 2015.
PCT Search Report and Written Opinion; mailed Sep. 15, 2016; PCT Application No. PCT/US2016/031482.

*Primary Examiner* — Thomas G Black
*Assistant Examiner* — Peter D Nolan
(74) *Attorney, Agent, or Firm* — Perkins Coie LLP

(57) ABSTRACT

A videography drone can communicate with a microphone device. The videography drone can receive spatial information and audio data from a remote microphone device (e.g., a remote tracker, a mobile device running a drone control application, and/or a standalone audio recording device separate from the videography drone without drone control functionalities). The videography drone can utilize the spatial information to navigate the videography drone to follow the remote microphone device. The videography drone can stitch a video segment captured by its camera with an audio segment from the received audio data to generate an audio/video (A/V) segment. The stitching can be performed by matching spatial or temporal information (e.g., from the received spatial information) associated with the audio segment against spatial or temporal information associated with the video segment.

19 Claims, 4 Drawing Sheets

Related U.S. Application Data

(60) Provisional application No. 62/159,794, filed on May 11, 2015.

(51) Int. Cl.

| | |
|---|---|
| ***G10L 15/22*** | (2006.01) |
| ***H04R 1/08*** | (2006.01) |
| ***H04N 7/18*** | (2006.01) |
| ***G11B 27/031*** | (2006.01) |
| ***G11B 27/10*** | (2006.01) |
| ***G05D 1/00*** | (2006.01) |
| ***B64C 39/02*** | (2006.01) |

(52) U.S. Cl.

CPC ........ *G10L 21/0208* (2013.01); *G11B 27/031* (2013.01); *G11B 27/10* (2013.01); *H04N 7/185* (2013.01); *H04R 1/08* (2013.01); *G10L 2015/223* (2013.01)

(56) References Cited

U.S. PATENT DOCUMENTS

| | | | | |
|---|---|---|---|---|
| 8,606,079 | B2 * | 12/2013 | Shibata | G11B 27/002 386/239 |
| 8,903,568 | B1 | 12/2014 | Wang et al. | |
| 8,948,575 | B2 * | 2/2015 | Webb | H04N 5/04 381/77 |
| 9,111,580 | B2 * | 8/2015 | Kirsch | G11B 27/105 |
| 9,332,160 | B1 * | 5/2016 | Chenillo | H04L 29/06 |
| 2006/0104616 | A1 * | 5/2006 | Shellshear | G11B 27/10 386/224 |
| 2009/0171902 | A1 * | 7/2009 | MacLaurin | G06Q 10/10 |
| 2009/0207277 | A1 * | 8/2009 | Kurihara | H04N 5/232 348/231.4 |
| 2009/0226149 | A1 * | 9/2009 | Shibata | G11B 27/002 386/241 |
| 2010/0224732 | A1 | 9/2010 | Olson et al. | |
| 2013/0077805 | A1 * | 3/2013 | Kirsch | G11B 27/105 381/119 |
| 2014/0169768 | A1 * | 6/2014 | Webb | H04N 5/04 386/285 |
| 2015/0104151 | A1 * | 4/2015 | Webb | H04N 5/04 386/241 |
| 2015/0370250 | A1 * | 12/2015 | Bachrach | G05D 1/0016 701/2 |
| 2016/0054737 | A1 * | 2/2016 | Soll | G11B 27/031 701/3 |
| 2016/0055883 | A1 * | 2/2016 | Soll | G11B 27/031 386/285 |
| 2016/0063987 | A1 * | 3/2016 | Xu | B64C 39/024 381/71.12 |
| 2016/0161946 | A1 | 6/2016 | Wuth Sepulveda et al. | |

* cited by examiner

EXTERNAL MICROPHONE FOR AN UNMANNED AERIAL VEHICLE

CROSS-REFERENCE TO RELATED APPLICATIONS

This application is a continuation-in-part application of U.S. patent application Ser. No. 14/875,268, filed on Oct. 5, 2015; which claims the benefit of U.S. Provisional Patent Application Ser. No. 62/159,794, filed on May 11, 2015, both of which are incorporated by reference herein in their entirety.

TECHNICAL FIELD

At least one embodiment of this disclosure relates generally to unmanned aerial vehicles (UAVs).

BACKGROUND

UAVs for consumers have traditionally been limited to entertainment as toys or as hobbyist collector items. Recently, however, UAVs have been used for personal photography and videography. A UAV can be equipped with a portable power source and an image capturing apparatus, such as a camera or other types of sensors. For example, a photographer or a videographer can use a UAV to photograph or film athletes participating in outdoor activities when there are no overhead obstructions. The UAV can also be used to document special occasions, such as weddings, engagement proposals, and other activities that may occur in an open field. These applications require video recording along with audio to fully capture the moment. Conventional UAVs carry a camera and capture audio from the air, which is very low quality because of noise from the propellers and distance from the user.

DISCLOSURE OVERVIEW

Disclosed is a design of a UAV with a camera and an external microphone that records audio directly from the user. The noise created by propellers on a UAV, as well as the typical distance a UAV flies from its subject makes audio collected by the UAV useless. Adding an external microphone in a remote control device carried by the subject enables an UAV to combine and synchronize audio from the remote control device with the video captured by the UAV. The remote control device can be a location tracker device configured to report the subject's location to the UAV or a mobile device implementing a drone control application (e.g., including a user interface to control/navigate the UAV). In some embodiments, the mobile device implementing the drone control application is the location tracker device. In some embodiments, a standalone microphone device, independent of the remote control device, can synchronize audio with the UAV. The standalone microphone device can be a microphone device without drone control capabilities/functionalities.

In various embodiments, a microphone device can stream audio via electromagnetic signals (e.g., WiFi, Bluetooth, Bluetooth low energy, infrared, laser, other radiofrequency, etc.) to the main camera system in the UAV. In real time, the audio is streamed to the main system to ensure that audio is recorded in the event that the microphone is lost or damaged. This also reduces the need for a large memory storage solution on the microphone device.

In some embodiments, audio is saved on the microphone device. Audio can be saved in raw or encoded format (e.g., MP3) on the microphone device and can be later synchronized with the video. This can be used if a wireless connection with the main video system is not possible, due to interference or unreliability. This also reduces the need for an RF connection between the two devices.

In some embodiments, the microphone device can be clipped onto clothing to better capture user speech. The microphone device can be part of various kinds of accessories (e.g., clips, plastic cases, other mobile devices, etc.) and various kinds of form factors.

For applications that require user speech to be recorded, proper placement of a microphone is important to the quality of the audio. A special clip can be used to ensure that the device is mounted near the subject's mouth. The attachment mechanism can be a necklace, a clip to this shirt, a headband, an armband, or any combination thereof. For example, the attachment mechanism can be modularly detachable to facilitate convenient switching of attachment mechanism types. Similar mechanical mounts can be used on machines or other parts of a subject to capture specific types of sounds: for example, hard mounting to a skateboard to capture the sound of the wheels rolling.

In some embodiments, the microphone device is waterproof and can capture underwater audio. Ruggedizing of the microphone device can enable the user to be recorded in more extreme environments, which can yield more interesting content. In some embodiments, a plastic case is provided for the microphone that protects the device from dust and water. This reduces the cost and complexity of the device, and allows for a smaller device that can be used when waterproofness and dust proofing are not required.

In some embodiments, a Global Positioning System (GPS) timestamp is used to synchronize the audio with the video. Both the UAV and the microphone device have internal GPS modules that periodically record the GPS timestamp. The audio and video are later integrated by aligning these timestamps. In some embodiments, a system can be used to synchronize the audio and video by sharing a unique event or time based data between the two devices.

In some embodiments, the camera on the UAV is mounted on a vibration isolation system. The vibration isolation system can reduce vibration from the propellers to ensure sharper video. The vibration isolation system can protect the glass lens from impacts. The vibration isolation system can enable the UAV to be more rugged than conventional drone-camera systems. The camera lens may be one of the most fragile parts. In some embodiments, the vibration isolation system involves a hard shell that surrounds the camera. For example, the hard shell can be made of rubber, so that the dampening is less hard. This enables for more impact space.

Some embodiments of this disclosure have other aspects, elements, features, and steps in addition to or in place of what is described above. These potential additions and replacements are described throughout the rest of the specification.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Figure 1:
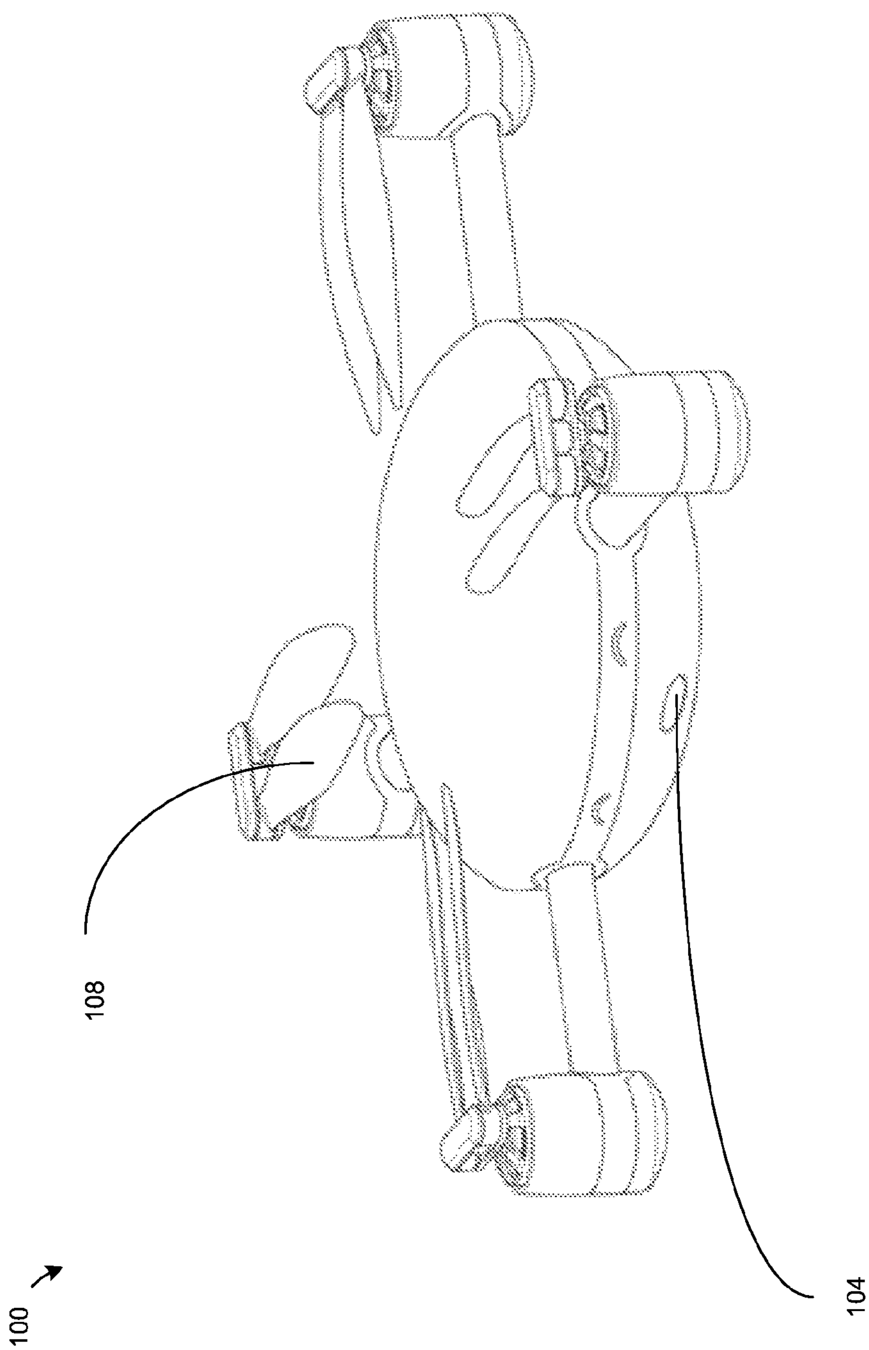
FIG. 1 is a perspective view of an unmanned aerial vehicle (UAV), in accordance with various embodiments.

FIG. 1 is a perspective view of an unmanned aerial vehicle (UAV) 100, in accordance with various embodiments. In several embodiments, the UAV 100 is a videography drone that includes a camera 104. The camera 104 can be for filming and/or for photographing. The UAV 100 can be a copter. For example, the UAV 100 includes one or more propellers 108. In various embodiments, the UAV 100 is controlled by one or more operator devices, such as a remote tracker (see FIG. 2) and/or a drone control application running on a general-purpose device (e.g., a mobile device, such as a smart phone, a laptop, or a wearable device). The remote tracker and/or the general-purpose device implementing the drone control application can be represented by the remote control device 400 of FIG. 4. In some embodiments, the general-purpose device is the remote tracker.

Figure 2A:
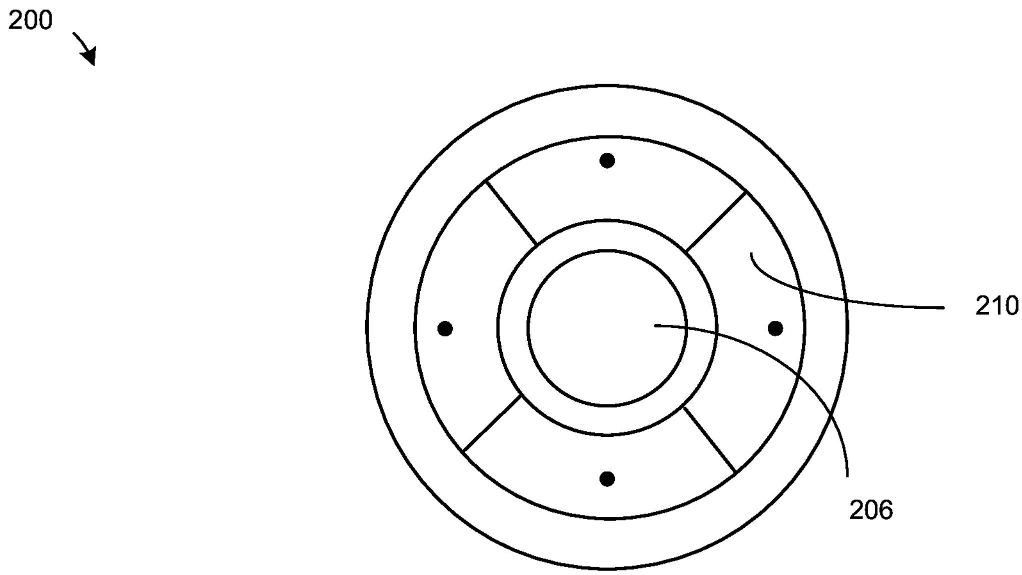
FIG. 2A is a top view of a remote tracker of an UAV, in accordance with various embodiments.
Figure 2B:
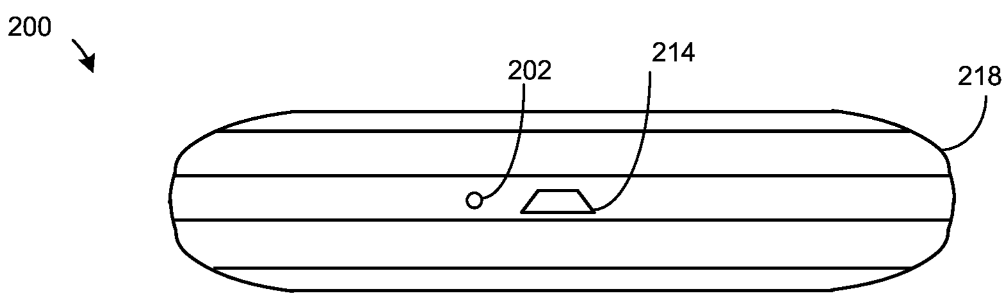
FIG. 2B is a side view of the remote tracker of FIG. 2A.

FIG. 2A is a top view of a remote tracker 200 of an UAV (e.g., the UAV 100), in accordance with various embodiments. FIG. 2B is a side view of the remote tracker 200 of FIG. 2A. The remote tracker 200 can be coupled wirelessly to the UAV. The remote tracker 200 can be a portable device separate from the UAV. For example, the remote tracker 200 can be shaped as a puck or a disk. In the illustrated top view, the remote tracker 200 is circular. In other embodiments, the remote tracker 200 can have a rectangular or oval top view. In the illustrated side view, the remote tracker 200 can have a rounded side profile.

The remote tracker 200 can include a microphone 202, a first input button 206, a second input button 210, a power port 214, or any combination thereof. The remote tracker 200 can include a protective case 218 enclosing various components (e.g., as described in FIG. 4) and exposes the first input button 206, the second input button 210, and the power port 214. The protective case 218 can at least partially encloses the microphone 202. For example, the protective case 218 can expose at least a portion of the microphone 202 to record external sound. In some embodiments, the remote tracker 200 can include multiple microphones. For example, the remote tracker 200 can include four microphones spaced equally apart (e.g., 90° apart and along the same radius from the center).

The first input button 206 can be a round shaped button in the center of the remote tracker 200. The second input button 210 can be a ring-shaped button (e.g., a complete ring or a segment of a ring) surrounding the center of the remote tracker 200. The input buttons enable a user carrying the remote tracker 200 to interact with a logic component therein. For example, clicking on or holding down one of the input buttons can turn the remote tracker 200 on or turn the UAV on. In another example, clicking on or holding down one of the input buttons can mute, start, pause, or stop an audio recording of the microphone 202 or start, pause, stop, or censor a video recording of a camera (e.g., the camera 104) of the UAV.

The power port 214 can be a universal serial bus (USB) port. The power port 214 can accept a cable with an adapter head that plugs into the power port 214. The cable can deliver electrical power (e.g., direct current (DC) power) to charge the remote tracker 200. In some embodiments, the power port 214 can also be a communication port that enables a wired interconnection with an external computing device. For example the wire interconnection can be used to download data stored in a memory of the remote tracker 200 and/or to update or debug logical/functional components within the remote tracker 200.

Figure 3:
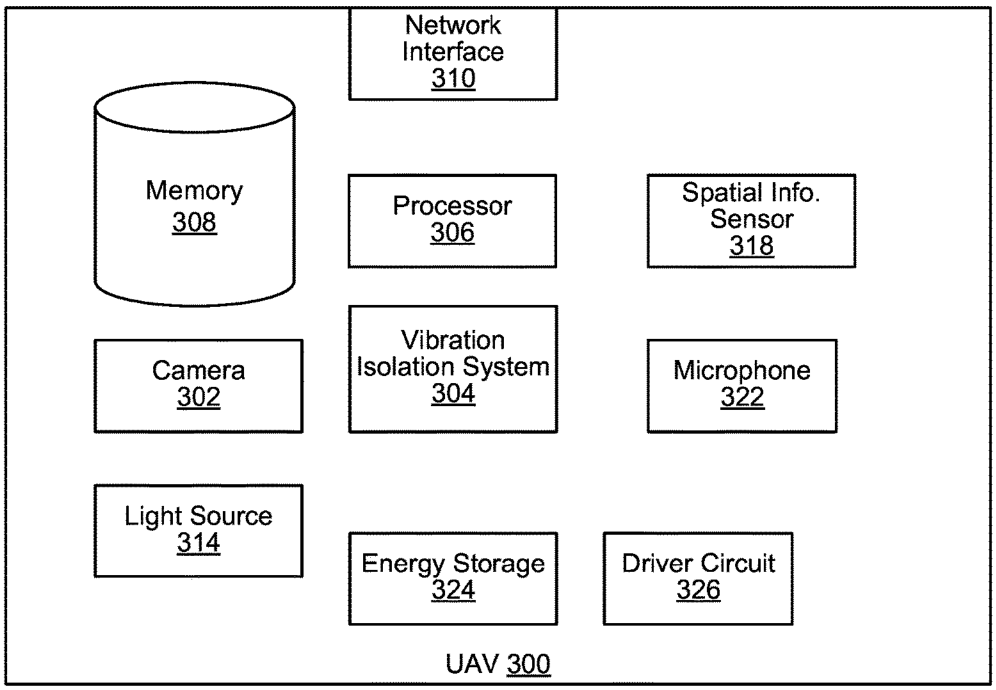
FIG. 3 is a block diagram illustrating components of a UAV, in accordance with various embodiments.

FIG. 3 is a block diagram illustrating components of a UAV 300 (e.g., the UAV 100), in accordance with various embodiments. The UAV 300 can include a camera 302, a vibration isolation system 304 for the camera 302, a processor 306, a memory 308, a network interface 310, or any combination thereof. Optionally, the UAV 300 can include a light source 314 (e.g., camera flash or a flashlight). The light source 314 can provide illumination to the subject of the camera 302. The camera 302 can be the camera 104 of FIG. 1. In some embodiments, the UAV 300 can include a spatial information sensor 318 (e.g., an accelerometer, a GPS module, a motion detector, a gyroscope, a cellular triangulation module, other inertial sensors, etc.). The processor 306 can implement various logical and functional components (e.g., stored as processor-executable executable instructions in the memory 308) to control the UAV 300 in real-time in absence of explicit real-time commands from an authorized user. However, in several embodiments, the authorized user can configure (e.g., via a drone control application) the operating modes of the UAV 300 prior to or during its flight. The drone control application can implement an interactive user interface to configure the UAV 300 and/or a remote tracker of the UAV 300. The drone control application can be a mobile application.

The network interface 310 can enable wireless communication of the UAV 300 with other devices. For example, the network interface 310 enables the UAV 300 to communicate wirelessly with a computing device (e.g., a mobile device) running the drone control application (e.g., a mobile application). In several embodiments, the network interface 310 can also enable the UAV 300 to communicate with a remote tracker (e.g., the remote tracker 200 of FIG. 2 and/or the remote tracker 400 of FIG. 4). In some embodiments, the network interface 310 enables a computing device to update firmware or software of the UAV 300 (e.g., stored in the memory 308).

In several embodiments, the UAV 300 can also include an energy storage 324 and a driver circuit 326. The energy storage 324, for example, can be a battery, a fuel cell, a fuel tank, or any combination thereof. The driver circuit 326 can be configured to drive propellers (e.g., the propellers 108 of FIG. 1) of the UAV 300. The processor 306 can control the driver circuit 326. The driver circuit 326, in turn, can individually control the driving power and speed of each propeller.

Figure 4:
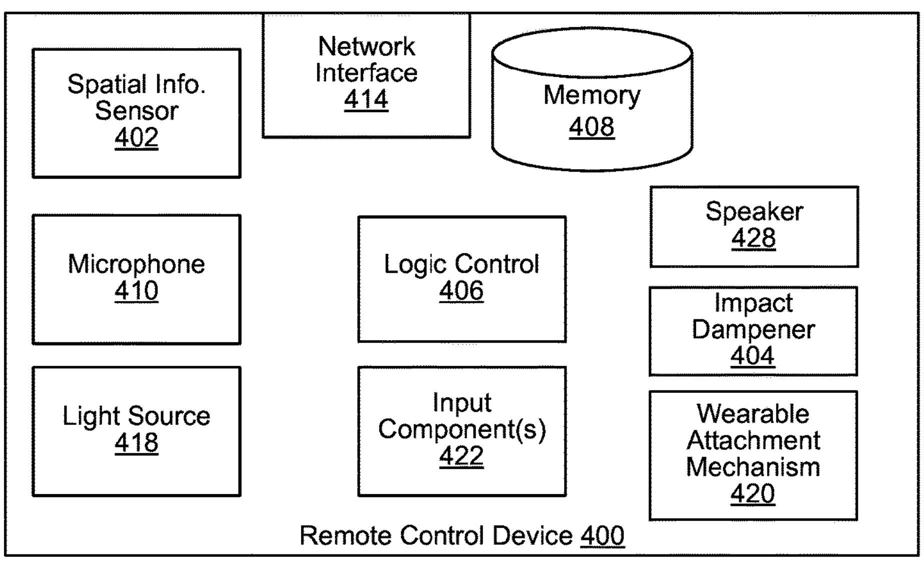
FIG. 4 is a block diagram illustrating components of a remote control device of a UAV, in accordance with various embodiments.

FIG. 4 is a block diagram illustrating components of a remote control device 400 (e.g., the remote tracker 200 and/or a mobile device running a drone control application) of a UAV (e.g., the UAV 100 and/or the UAV 300), in accordance with various embodiments. In some embodiments, the remote control device 400 is a smart phone with a touch screen. The remote control device 400 can be an application-specific device with built-in drone control capability or a general-purpose device configured by a drone control application. The components of the remote control device 400 can be enclosed by a protective shell (e.g., the protective case 218 of FIG. 2). In some embodiments, the remote control device 400 includes an impact dampener 404 between the protective shell (e.g., the protective case 218) and the components (e.g., a spatial information sensor 402, logic control component 406, a memory 408, and a microphone 410) of the remote control device 400.

The remote control device 400 can include the spatial information sensor 402. For example the spatial information sensor 402 can be a global positioning system (GPS) module, an accelerometer, a gyroscope, a cellular triangulation module, other inertial motion sensors, or any combination thereof. In some embodiments, the spatial information sensor 402 is a GPS module. The spatial information sensor 402 can be a GPS module of the same model and type as the spatial information sensor 318 of the UAV 300.

The remote control device 400 can be a portable device to be carried by a user of the UAV. The remote control device 400 further includes the logic control component 406, the memory 408, the microphone 410, a network interface 414, a light source 418, or any combination thereof. In some embodiments, the remote control device 400 includes a wearable attachment mechanism 420 (e.g., a belt, a strap, fastener, a clip, a hook, a headband, an armband or any combination thereof). The logic control component 406 can implement various logical and functional components (e.g., stored as machine executable instructions in the memory 408) of the remote control device 400. In some embodiments, the logic control component 406 is an application-specific controller and/or circuit. In some embodiments, the logic control component 406 is a general-purpose processor configured to run an operating system. In these embodiments, a drone control application can be implemented on the operating system.

In several embodiments, the remote control device 400 can passively control the UAV 300 in real-time without the user's direct involvement or input in real-time. For example, the user can configure the UAV 300 to follow the remote control device 400. That is, the user does not control the movement of the UAV 300, but the UAV 300 tracks the user movement via the spatial information sensor 402 of the remote control device 400. The network interface 414 can send the spatial information captured by the spatial information sensor 402 to the UAV 300 such that the UAV 300 navigates within a constant distance (and/or constant direction/angle) from the remote control device 400 and points the camera 302 toward the remote control device 400. In some embodiments, the remote control device 400 includes an input component 422 (e.g., the first input button 206 and/or the second input button 210) such that the user can actively interact with the remote control device 400. In some embodiments, the input component 422 can be implemented by a touchscreen displaying virtually interactive buttons.

The microphone 410 can be configured to capture audio data surrounding the remote control device 400. The logic control component 406 can be configured to decorate the audio data with location-based metadata (e.g., derived from the spatial information sensor 402) and temporal metadata (e.g., from a digital clock implemented by the logic control component 406 or from the spatial information sensor 402). For example, the temporal metadata can be a GPS timestamp from a GPS module. In some embodiments, the logic control component 406 is configured to convert the audio data to text via a voice recognition process and annotate the audio data with caption based on the text.

The network interface 414 can be configured to communicate with the network interface 310. In some embodiments, the network interface 414 is configured to automatically discover a network interface (e.g., the network interface 310) of a videography drone when the videography drone is within wireless communication radius from the remote control device 400.

The network interface 414 can be configured to stream the audio data captured by the microphone 410 to the network interface 310. In various embodiments, when the network interface 310 receives the streamed audio data, the processor 306 stores the streamed audio data in the memory 308, or other buffer, cache, and/or data storage space. In some embodiments, the processor 306 synchronizes a video file captured from the camera 302 with an audio file from the microphone 410 (e.g., in the memory 308). In these embodiments, the processor 306 stitches the video file together with the audio file. The stitching can occur after the streamed audio data is saved as the audio file. In some embodiments, the processor 306 is configured to synchronize, in real-time, a video stream captured from the camera 302 and the stream of audio data. That is, the processor 306 can generate and append to a video file with the streamed audio data integrated therein in real-time. The processor 306 can save the generated video file into the memory 308. For example, synchronization of the video stream and the audio stream can be based on at least a timestamp entry associated with the video stream and a time stamp entry associated with the audio stream. These timestamps can be GPS timestamps from the same GPS module or from GPS modules of the same type and model.

In some embodiments, the logic control component 406 is configured to analyze the audio data from the microphone 410 to select a voice command by matching against one or more voice patterns associated with one or more voice commands. The memory 408 can store the voice patterns and associations between the voice patterns and the voice commands. The network interface 414 can be configured to send the selected voice command (e.g., a command to start/stop/pause/sensor the video recording by the camera 302 or to switch between operating modes of the UAV 300) to the network interface 310, in response to selecting the voice command based on the audio data analysis. The logic control component 406 can be configured to execute the selected command (e.g., a command to start/stop/pause/mute the audio recording by the microphone 410).

In some embodiments, the logic control component 406 is configured to analyze the audio data to identify a high noise event. The network interface 414 can be configured to notify the network interface 310 regarding the high noise event. The processor 306 can be configured to process the video data differently in response to the network interface 310 receiving a message indicating the high noise event. For example, processing the video data differently can include processing the video data in slow motion.

In some embodiments, the processor 306 is configured to filter propeller noise from the streamed audio data received from the remote control device 400. In one example, the UAV 300 includes a microphone 322. The processor 306 can subtract the propeller noise recorded by the microphone 322 from the streamed audio data from the remote control device 400. In some embodiments, the logic control component 406 is configured to remove propeller noise from the audio data prior to streaming the audio data to the videography drone.

In some embodiments, the microphone 322 and/or the microphone 410 is configured to start recording the audio data when the network interface 310 notifies the network interface 414 that the UAV 300 is in flight or the UAV 300 is on. In some embodiments, the microphone 322 and/or the microphone 410 is configured to start recording when the network interface 310 receives a command from a computing device (e.g., the remote control device 400 or a separate device) implementing the drone control application. The drone control application, in response to a user interaction with the computing device, can send a command to stop or pause the recording. In some embodiments, the drone control application, in response to a user interaction with the computing device, can add an audio filter, audio transformer, and/or data compressor to process the audio data captured by the microphone 322.

In some embodiments, the remote control device 400 includes a speaker 428. The speaker 428 can be configured to play a sound in response to a command or an alert received via the network interface 414 from the videography drone (e.g., the UAV 300). For example, the received alert can be an indication that an energy storage (e.g., the energy storage 324) of the UAV 300 is running low.

In some embodiments, the remote control device 400 includes the light source 418 to illuminate an area surrounding the remote control device 400. Because the remote control device 400 is designed to track the movement of a target subject of the camera 302, the light source 418 can facilitate the UAV 300 to photograph/film the target subject.

Components (e.g., physical or functional) associated with the UAV 300 and/or the remote control device 400 can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

Figure 5:
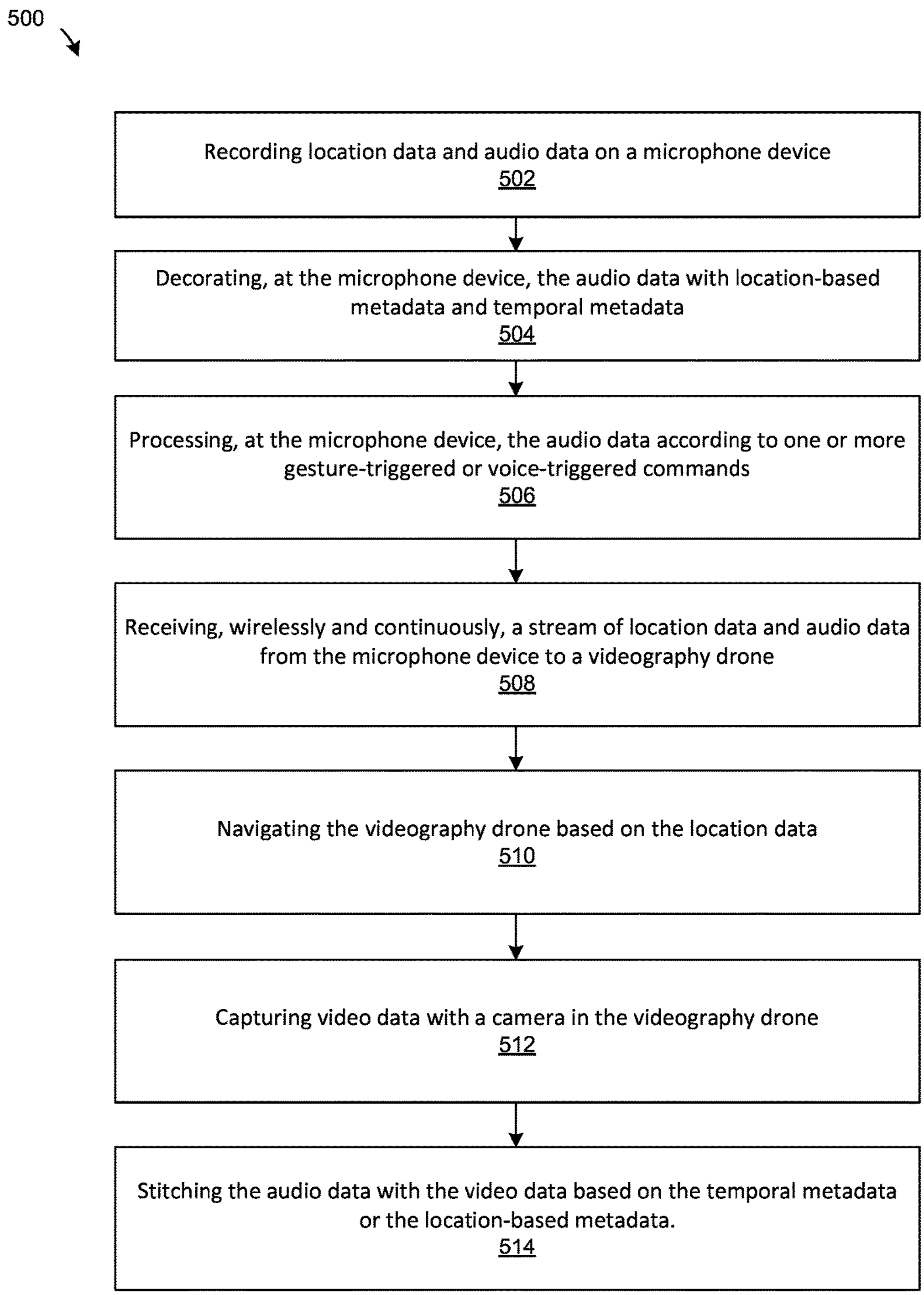
FIG. 5 is a flowchart illustrating a method of recording a video utilizing an UAV and a microphone device, in accordance with various embodiments.

FIG. 5 is a flowchart illustrating a method 500 of recording a video utilizing an UAV (e.g., the UAV 100 and/or the UAV 300) and a microphone device (e.g., a stand-alone audio recording device, the remote tracker 200, and/or the remote control device 400), in accordance with various embodiments. The UAV can be a videography drone. At step 502, the microphone device can record its location data (e.g., via the spatial information sensor 402) and audio data (e.g., via the microphone 410) of its environment. At step 504, the microphone device can decorate the audio data with location-based metadata and/or temporal metadata. At step 506, the microphone device can process the audio data according to one or more gesture-triggered or voice-triggered commands.

For example, the spatial information sensor 402 can provide motion vector information that tracks the movement of the microphone device. The microphone device can then match the motion vector information against movement patterns associated with gesture-triggered commands. When there is a match, the matching gesture-triggered command is executed by the microphone device and/or delivered to the UAV for execution. In one example, the spatial information sensor (e.g., an accelerometer) can detect a jumping motion to trigger a slow mode for the video capture at the UAV. In another example, a logic control component in the microphone device can process the audio data to recognize audio patterns associated with voice-triggered commands. When there is a match, the matching voice-triggered command is executed by the microphone device and/or delivered to the UAV for execution. The gesture-triggered command or the voice triggered command can include turning on/off the UAV, starting/stopping/pausing/muting an audio recording by the microphone of the microphone device, starting/stopping/pausing/censoring a video recording by the camera of the UAV, initiating a slow motion video capture at the UAV and a corresponding slow audio recording at the microphone device, a preset data transformation of the audio data or the video data, or any combination thereof.

At step 508, the UAV can receive, wirelessly and continuously, a stream of the location data and the audio data from the microphone device. At step 510, the UAV can navigate to a position based on the received location data (e.g., at a preset distance and/or angle/direction from the microphone device). At step 512, the UAV can capture video data with a camera pointing toward the microphone device based on the location data of the microphone device. At step 514, a processor of the UAV can stitch the audio data with the video data based on the temporal metadata of the audio data and/or the location-based metadata of the audio data. Step 514 can produce a multimedia file with both audio and video data. For example, the stitching can include matching a segment of the audio data and a segment of the video data when both segments share the same timestamp and/or the same location tag (e.g., after shifting at least one of the location tag by the constant distance and/or constant direction designated as the preset positioning of the UAV and the microphone device).

In some embodiments, the UAV is networked with multiple microphone devices. In one example, the UAV can include multiple audio channels from the multiple microphone devices in the multimedia file produced from step 514. In another example, the UAV can create an audio channel blended from multiple audio sources corresponding to the audio data respectively from the multiple microphone devices. "Blending" can include mixing the audio data together from different subsets (e.g., one or more) of the multiple audio sources for different time segments in the blended audio channel. The blending can also include different weighted volume adjustments from the different audio sources when mixing the audio data together from the different subsets. The blending can be controlled by a multimedia production configuration store in the UAV's memory. The multimedia production configuration can dictate how many audio channels are in the multimedia file and how the blending is performed.

In some embodiments, the UAV is networked with one or more sensor devices to stitch other sensor signals (e.g., other than audio data) with the video data in the multimedia file. In some embodiments, the sensor devices can include a microphone device. That is, the sensor device can have a microphone and a non-auditory sensor. For example, the UAV can network with a heart rate monitor device, which can either be a microphone device or a separate device. When the UAV is blending the heart rate signal into the multimedia file, the processor of the UAV can visually represent the heart rate signals and add the visual representation in the video data.

In various embodiments, the UAV can stitch together audio data, video data, and/or representations of one or more other sensor signals in real time (e.g., while flying). In other embodiments, the UAV can package the audio data, video data, and/or the other sensor signals to be re-blended based on different multimedia production configurations selected by a user at a later time.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification. Reference in this specification to "various embodiments," "several embodiments," or "some embodiments" means that a particular feature, structure, or characteristic described in connection with the embodiment is included in at least one embodiment of the disclosure. Moreover, various features are described which may be exhibited by some embodiments and not by others. Similarly, various requirements are described which may be requirements for some embodiments but not for other embodiments.

Some embodiments of the disclosure have other aspects, elements, features, and steps in addition to or in place of what is described above. These potential additions and replacements are described throughout the rest of the specification. For example, some embodiments include a videography drone. The videography drone can include a spatial information sensor configured to continuously determine and update spatial locations of the videography drone. The videography drone can include a camera configured to capture video data. The video data can include at least a video segment decorated by a video segment timestamp of when the video segment is captured and a video segment spatial coordinate from the spatial information sensor of where the video segment is captured. The videography drone can include a network interface configured to communicate, wirelessly, with a microphone device (e.g., the remote tracker 200 and/or the remote control device 400). The network interface can receive audio data and spatial location data from the microphone device in an open-ended stream. The audio data can include an audio segment associated with an audio segment spatial coordinate from the spatial location data and an audio segment timestamp. The videography drone can include a flight system (e.g., the driver circuit 326) configured to navigate the videography drone based at least on the spatial locations from the spatial information sensor and the received spatial location data from the microphone device. For example, the flight system can navigate the videography drone to follow the microphone device.

The videography drone can include a processor (e.g., the processor 306) configured to generate an audio/video (A/V) segment at least from aligning the video segment and the audio segment. This alignment can be based at least on matching the video segment spatial coordinate against the audio segment spatial coordinate and/or matching the video segment timestamp against the audio segment timestamp. The videography drone can further include a microphone to record background noise data. The processor can filter the background noise data from the received audio data. The processor can generate the A/V segment while the videography drone is in flight. The spatial information sensor can be an accelerometer, a global positioning system (GPS) module, a motion detector, a gyroscope, a cellular triangulation module, an inertial sensor, or any combination thereof.

Some embodiments can include a method of operating a videography drone. For example, the videography drone can capture video data with a camera of the videography drone. The video data can include an open-ended sequence of video segments. Each video segment can be associated with a spatial coordinate. The videography drone can receive spatial location data and audio data from a microphone device (e.g., a device, such as the remote tracker 200 and/or the remote control device 400), separate from the videography drone). For example, the videography drone receives an open-ended sequence of spatial coordinates and an open-ended sequence of audio segments from the microphone device. The sequences can be part of a single stream or received as separate streams. The videography drone can navigate based on the spatial location data.

The videography drone can synchronize the received audio data with the captured video data by stitching at least an audio segment of the audio data with a video segment of the video data. For example, the stitching can be based on matching a first spatial coordinate associated with the audio segment with a second spatial coordinate associated with the video segment. The synchronization can include combining the captured video data and the received audio data in an audio/video (A/V) file stored in a persistent data memory of the videography drone. The synchronization can be performed in real-time as the video segment is captured and the audio segment is received or asynchronously from when the video segment is captured and from when the audio segment is received. The synchronization can be performed continuously as an additional video segment is captured and an additional audio segment is received.

The videography drone can track spatial location of the videography drone. The videography drone can navigate to follow the microphone device. For example, the videography drone can compare the spatial location data from the microphone device to the tracked spatial location of the videography drone to follow the microphone device. The videography drone can identify the second spatial coordinate as a spatial location of the videography drone when the video segment is taken and associate the second spatial coordinate with the video segment.

The videography drone can synchronize based at least on matching a first timestamp of the video segment to a second timestamp of the audio segment within a preset tolerance range. For example, the first timestamp and the second timestamp can be GPS timestamps.

In some embodiments, the videography drone can analyze the audio data from the microphone device to select a voice command by matching the audio data against one or more preset voice patterns associated with one or more preset voice commands and execute the selected voice command on the videography drone. The videography drone can also analyze the audio data to identify an audio pattern event and execute a preset action in response to identifying the audio pattern event. The preset action can include stitching the video segment and the audio segment differently than previously before the preset action is executed. The preset action can include navigating the videography drone differently than previously before the preset action is executed.

Some embodiments include a method of operating a microphone device (e.g., the remote tracker 200 and/or the remote control device 400). The method can comprise: establishing a wireless connection between the microphone device and a videography drone; capturing audio data via a microphone on the microphone device; determining location data associated with the microphone device utilizing a spatial information sensor of the microphone device; and sending, continuously, an open-ended stream of the location data and the audio data from the microphone device to the videography drone via the wireless connection. The audio data can be decorated with location-based metadata based on the location data synchronized to when the audio data is captured. The audio data can be decorated with one or more timestamps synchronized to when the audio data is captured.

What is claimed is:

1. A videography drone comprising:

a spatial information sensor configured to continuously determine and update spatial locations of the videography drone;

a camera configured to capture video data, wherein the video data includes at least a video segment decorated by a video segment timestamp of when the video segment is captured and a video segment spatial coordinate from the spatial information sensor of where the video segment is captured;

a network interface configured to communicate, wirelessly, with a remote control device, wherein the network interface is configured to receive audio data and spatial location data from the remote control device in an open-ended stream, wherein the audio data includes an audio segment associated with an audio segment spatial coordinate from the spatial location data and an audio segment timestamp;

a flight system configured to navigate the videography drone based at least on the spatial locations from the spatial information sensor and the received spatial location data from the remote control device;

a microphone to record background noise data; and a processor configured to filter the background noise data from the received audio data, and generate an audio/video (A/V) segment at least from aligning the video segment and the audio segment, wherein said aligning is based at least on matching the video segment spatial coordinate against the audio segment spatial coordinate or matching the video segment timestamp against the audio segment timestamp.

2. The videography drone of claim 1, wherein the processor is configured to generate the A/V segment while the videography drone is in flight.

3. The videography drone of claim 1, wherein the spatial information sensor is an accelerometer, a global positioning system (GPS) module, a motion detector, a gyroscope, a cellular triangulation module, an inertial sensor, or any combination thereof.

4. A method of operating a videography drone comprising:

capturing video data with a camera of the videography drone, wherein the video data comprises an open-ended sequence of video segments;

recording background noise data with a microphone of the videography drone;

receiving spatial location data and audio data from a microphone device separate from the videography drone, wherein said receiving includes receiving an open-ended sequence of spatial coordinates and an open-ended sequence of audio segments from the microphone device;

filtering the background noise data from the received audio data;

navigating the videography drone based at least on the spatial location data; and synchronizing the received audio data with the captured video data by stitching at least an audio segment of the audio data with a video segment of the video data, and wherein said stitching is based on at least matching a first spatial coordinate associated with the audio segment from the microphone device with a second spatial coordinate associated with the video segment.

5. The method of claim 4, further comprising:

tracking a spatial location of the videography drone; and said navigating is based at least on comparing the spatial location data from the microphone device to the tracked spatial location of the videography drone.

6. The method of claim 4, further comprising:

identifying the second spatial coordinate as a spatial location of the videography drone when the video segment is taken; and associating the second spatial coordinate with the video segment.

7. The method of claim 4, wherein said synchronizing includes combining the captured video data and the received audio data in an audio/video (A/V) file stored in a persistent data memory of the videography drone.

8. The method of claim 4, wherein said synchronizing is performed in real-time as the video segment is captured and the audio segment is received.

9. The method of claim 4, wherein said synchronizing is performed continuously as an additional video segment is captured and an additional audio segment is received.

10. The method of claim 4, wherein said synchronizing is performed asynchronously from when the video segment is captured and from when the audio segment is received.

11. The method of claim 4, wherein said synchronizing is based at least on matching a first timestamp of the video segment to a second timestamp of the audio segment within a preset tolerance range.

12. The method of claim 11, wherein the first timestamp and the second timestamp are global positioning system (GPS) timestamps.

13. The method of claim 4, further comprising:
analyzing the audio data from the microphone device to select a voice command by matching the audio data against one or more preset voice patterns associated with one or more preset voice commands; and
executing the selected voice command on the videography drone.

14. The method of claim 4, further comprising analyzing the audio data to identify an audio pattern event and executing a preset action in response to identifying the audio pattern event.

15. The method of claim 14, wherein the preset action includes stitching the video segment and the audio segment differently than previously before the preset action is executed.

16. The method of claim 14, wherein the preset action includes navigating the videography drone differently than previously before the preset action is executed.

17. The method of claim 14, wherein the audio pattern event is a high noise volume event.

18. A method of operating a remote control device, comprising:
establishing a wireless connection between the remote control device and a videography drone;
capturing audio data via a microphone on the remote control device;
determining location data associated with the remote control device utilizing a spatial information sensor of the remote control device;
sending, continuously, an open-ended stream of the location data and the audio data from the remote control device to the videography drone via the wireless connection,
wherein the audio data is decorated with location-based metadata based on the location data synchronized to when the audio data is captured;
wherein the audio data is decorated with one or more timestamps synchronized to when the audio data is captured;
capturing background noise data by a microphone on the videography drone; and
filtering the background noise data from the audio data sent by the remote control device via the open-ended stream by a processor of the videography drone.

19. The method of claim 18, wherein the microphone device is a general-purpose mobile device configured by a drone control application with a user interface implemented on a touch screen, an application-specific wearable tracker, or a standalone microphone device without drone control capability.

* * * * *